(12) United States Patent
Sherback et al.

(10) Patent No.: US 12,049,143 B2
(45) Date of Patent: Jul. 30, 2024

(54) BATTERY PRECONDITIONING FOR CHARGING (71) Applicant: Apple Inc., Cupertino, CA (US)

(72) Inventors: Michael A. Sherback, Mountain View, CA (US); Hamza W. Derbas, Menlo Park, CA (US); Jeremy S. Neubauer, Sunnyvale, CA (US)

(*) Notice: Subject to any disclaimer, the term of this patent is extended or adjusted under 35 U.S.C. 154(b) by 486 days.

(21) Appl. No.: 17/151,381

(22) Filed: Jan. 18, 2021

(65) Prior Publication Data

US 2021/0143649 A1 May 13, 2021

Related U.S. Application Data (63) Continuation of application No. 16/315,819, filed as application No. PCT/US2017/040343 on Jun. 30, 2017, now Pat. No. 10,931,124.

(60) Provisional application No. 62/358,599, filed on Jul. 6, 2016.

(51) Int. Cl.
H02J 7/00 (2006.01)
B60L 53/10 (2019.01)
B60L 58/26 (2019.01)

(52) U.S. Cl.
CPC ............ B60L 53/11 (2019.02); B60L 58/26 (2019.02); H02J 7/0013 (2013.01); B60L 2240/545 (2013.01); B60L 2240/622 (2013.01)

(58) Field of Classification Search
None
See application file for complete search history.

(56) References Cited

U.S. PATENT DOCUMENTS

| 5,825,159 A | 10/1998 | Patino |
| 6,856,866 B2 | 2/2005 | Nakao |
| 7,958,958 B2 | 6/2011 | de la Torre Bueno |
| 8,390,245 B2 | 3/2013 | Niwa et al. |
| 8,676,400 B2 | 3/2014 | Tippelhofer et al. |
| 2003/0082438 A1 | 5/2003 | Kwon |
| 2008/0012535 A1 | 1/2008 | Takatsuji et al. |
| 2008/0179040 A1 | 7/2008 | Rosenbaum |
| 2010/0039069 A1 | 2/2010 | Niwa et al. |
| 2010/0097036 A1 | 4/2010 | Wakayama |
| 2012/0041629 A1 | 2/2012 | Yamada et al. |
| 2012/0112696 A1 | 5/2012 | Ikeda et al. |
| 2012/0233077 A1 | 9/2012 | Tate, Jr. et al. |
| 2012/0303397 A1 | 11/2012 | Prosser |
| 2014/0121866 A1 | 5/2014 | Dangler et al. |
| 2014/0174712 A1 | 6/2014 | Yang et al. |
| 2014/0277869 A1 | 9/2014 | King et al. |
| 2015/0032659 A1* | 1/2015 | Manfield .......... B60L 3/12 705/347 |

(Continued)

FOREIGN PATENT DOCUMENTS

EP 2529979 A1 12/2012
WO 2016083529 A1 6/2016

OTHER PUBLICATIONS

International Search Report and Written Opinion issued in International Application No. PCT/US2017/040343 dated Oct. 5, 2017 (13 pp).

Primary Examiner — Arun C Williams
(74) Attorney, Agent, or Firm — Young Basile Hanlon & MacFarlane, P.C.

(57) ABSTRACT

A method includes pre-conditioning a battery for charging to support higher rates of charging the battery.

21 Claims, 8 Drawing Sheets (56) References Cited

U.S. PATENT DOCUMENTS

| | | |
|---|---|---|
| 2015/0120109 A1 | 4/2015 | Cun |
| 2016/0016485 A1 | 1/2016 | Deisler |
| 2016/0075247 A1 | 3/2016 | Uyeki |
| 2016/0129797 A1* | 5/2016 | Jackson .................. B60L 58/26 320/109 |
| 2018/0072181 A1 | 3/2018 | Christen et al. |
| 2021/0354591 A1* | 11/2021 | Iida ........................ B60L 53/68 |

* cited by examiner

BATTERY PRECONDITIONING FOR CHARGING

CROSS-REFERENCE TO RELATED APPLICATIONS

This application is a continuation of U.S. patent application Ser. No. 16/315,819, filed on Jan. 7, 2019, which is a National Phase Entry of International Application No. PCT/US2017/040343, filed on Jun. 30, 2017, which claims the benefit of U.S. Provisional Application No. 62/358,599, filed on Jul. 6, 2016. The contents of the foregoing applications are hereby incorporated by reference in their entireties for all purposes.

TECHNICAL FIELD

The application relates generally to battery management.

BACKGROUND

During charging of a rechargeable battery pack, resistive heat increases the temperature of the rechargeable battery pack. The rate at which a rechargeable battery pack is charged may be limited in order to limit the maximum temperature experienced by the rechargeable battery pack. But, reducing charging rate increases charging time.

SUMMARY

One aspect of the disclosure is a method that includes determining, by a system that includes a battery pack, that a potential charging operation is likely to occur based on a state of charge of the battery pack, and cooling the battery pack to prepare the battery pack for the potential charging operation.

One aspect of the disclosed embodiments is a method that includes identifying a battery charging location, setting a target temperature for thermal regulation of a battery pack based in part on the battery charging location, and regulating a temperature of the battery pack according to the target temperature.

Another aspect of the disclosed embodiments is a system that includes a battery pack, a navigation system that is configured to identify a battery charging location, and a thermal regulation system that is configured to regulate an actual temperature of the battery pack based on a target temperature. The thermal regulation system modifies the target temperature based on the battery charging location.

Another aspect of the disclosed embodiments is a method that includes identifying a planned route, identifying a battery charging location based on the planned route, and determining a travel energy requirement based on estimated use of a battery pack en route to the battery charging location using the planned route. The method also includes determining an excess energy amount based on the travel energy requirement and a state of charge of a battery pack, and reducing a temperature of the battery pack using a thermal regulation system upon determining that the excess energy amount exceeds a cooling energy requirement for reducing the temperature of the battery pack.

Another aspect of the disclosed embodiments is a method that includes determining that a battery pack is able to provide excess energy in addition to an anticipated energy usage during travel to a battery charging location, decreasing a target temperature for the battery pack in response to determining that the battery pack is able to provide the excess energy, and cooling the battery pack toward the target temperature prior to arriving at the battery charging location using at least part of the excess energy.

DETAILED DESCRIPTION

Figure 1:
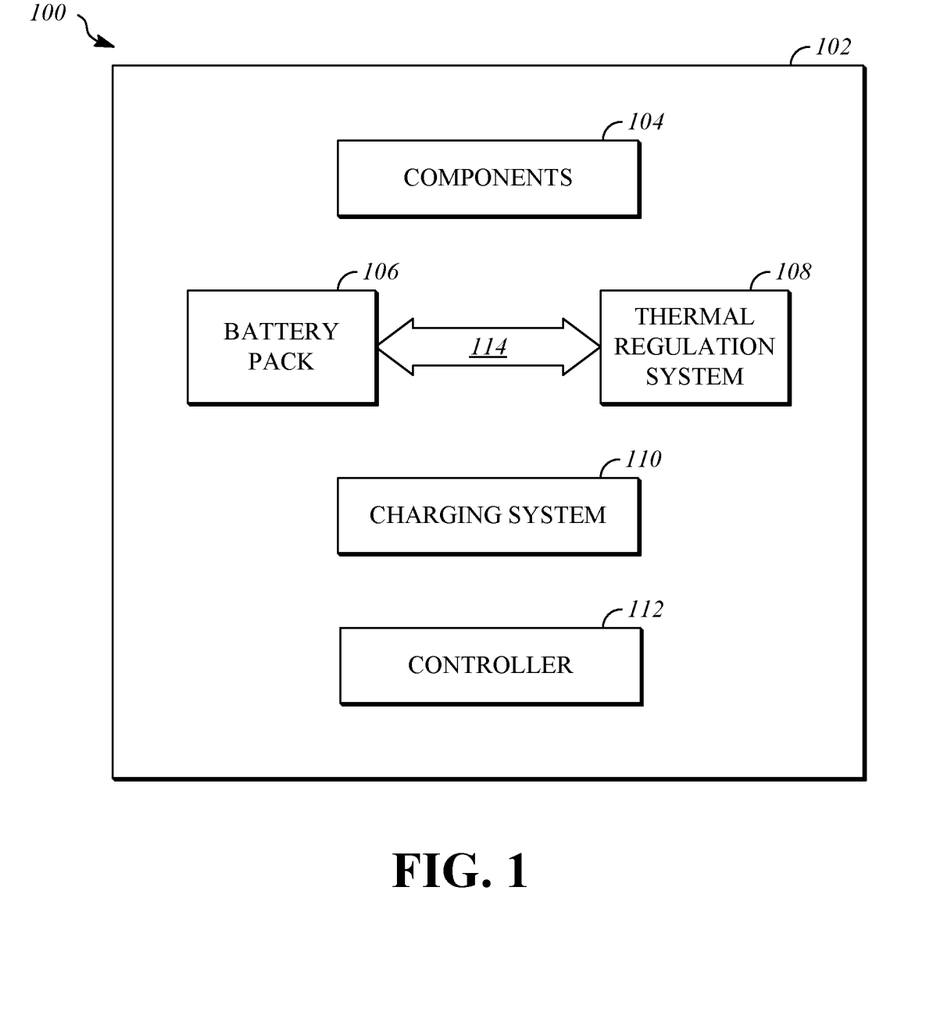
FIG. 1 is an illustration showing an exemplary system.

FIG. 1 shows a system 100 having a housing 102 that connects or encloses portions of the system 100, one or more components 104 that consume electrical energy, a battery pack 106, a thermal regulation system 108, a charging system 110, and a controller 112. The battery pack 106 is a rechargeable electricity storage device that provides electrical energy to the components 104 and/or other portions of the system 100. The battery pack 106 may include electrically interconnected rechargeable battery cells of any type, such as lithium ion cells or nickel-metal hydride cells.

The temperature of battery pack 106 can vary due to environmental conditions and/or usage conditions. For example, winter weather can lower the temperature of battery pack 106. As another example, charging and discharging□ particularly at fast rates□ can increase the temperature of battery pack 106. The battery pack 106 may experience degraded performance at temperature extremes. For example, if the battery pack 106 is too cold, internal impedance may rise and thereby limit the rate of energy transfer from the battery pack 106. If the battery pack 106 is too hot, it may degrade quickly or may become damaged.

In some embodiments, the thermal regulation system 108 is configured for heat transfer 114 with respect to the battery pack 106. In some embodiments, the thermal regulation system 108 is operable to heat the battery pack 106. In some embodiments, the thermal regulation system 108 is operable to cool the battery pack 106. The heating and/or cooling of the battery pack 106 helps maintain the temperature of the battery pack 106 within a range that optimizes performance of the battery pack 106. This range may be referred to as an operating temperature range. As one example, the thermal regulation system 108 may incorporate electrically operated heating and/or cooling devices such as resistive heating elements, thermoelectric heaters, or thermoelectric coolers. As another example, the thermal regulation system 108 may include a fluid transport circuit for circulating a heated or chilled fluid media.

In some embodiments, the charging system 110 is electrically connected to the battery pack 106 and is operable to charge battery pack 106. The charging system 110 may draw energy from external sources such as mains energy. In some implementations, the charging system 110 draws AC energy. In some implementations, the charging system 110 draws DC energy. In some implementations, the charging system 110 is able to draw both AC or DC energy. In some implementations, the charging system 110 is configured to draw energy wirelessly. In some implementations, the charging system 110 is configured to draw energy through a wired connection. In some implementations, the charging system 110 is configured to draw energy both wirelessly or through a wired connection.

In some embodiments, the controller 112 is operable to regulate operation of various portions of the system 100, such as by receiving information, processing the information according to stored instructions, and outputting command signals that regulate operation of the system 100. The controller 112 may include, as an example, a memory that stores computer program instructions and a processor that is operable to execute the computer program instructions. The computer program instructions may include instructions that cause the controller 112 to perform operations for thermal regulation of the battery pack 106. Although the controller 112 in the illustrated example is shown as a single device that performs many functions, it should be understood that the functions performed by the controller 112 may instead be performed by multiple devices, such as multiple controllers each having a separate memory and processor, and/or controller 112 may itself have multiple computer processors.

Figure 2:
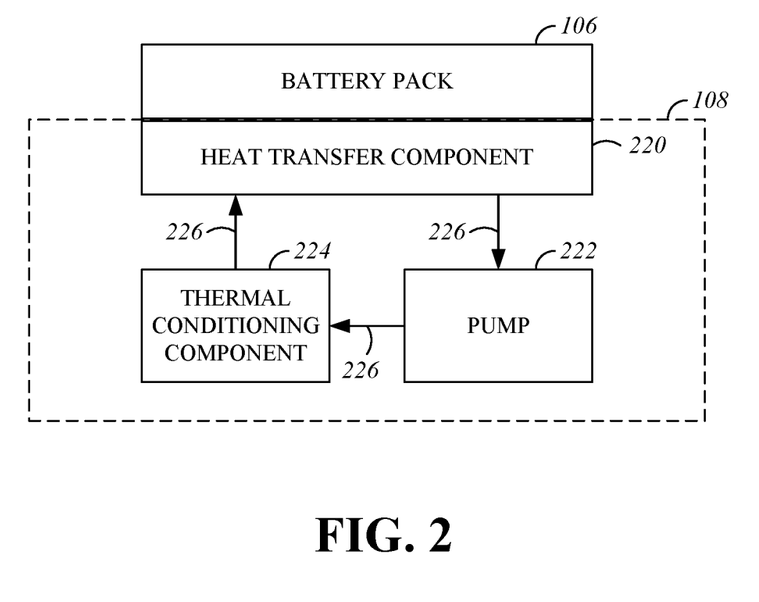
FIG. 2 is an illustration showing an exemplary thermal regulation system for a battery pack.

FIG. 2 illustrates an exemplary thermal regulation system 108 as including a heat transfer component 220, a pump 222, a thermal conditioning component 224, and conduit(s) 226. In some embodiments, these components facilitate liquid flow such as water, ethylene glycol, or another liquid refrigerant. In some embodiments, these components facilitate gas exchange, thereby allowing gaseous refrigerants, or refrigerants that undergo a phase change between liquid and gas to provide thermal conditioning of battery pack 106.

Figure 3:
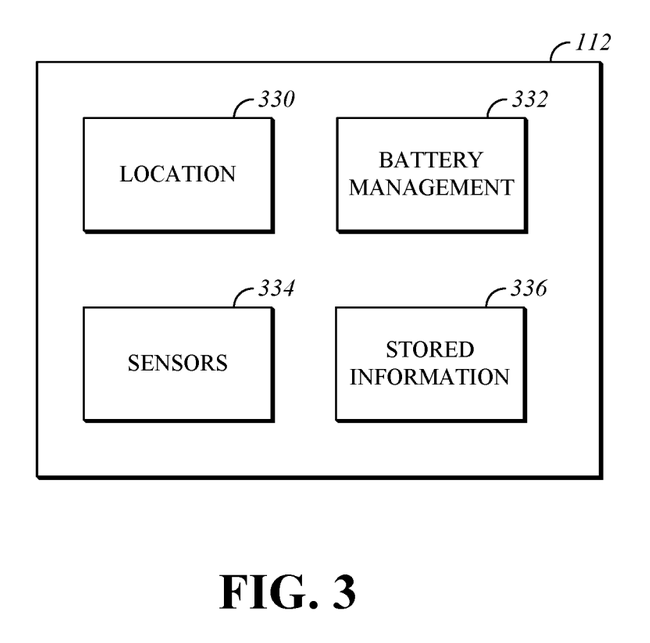
FIG. 3 is an illustration showing an exemplary controller.

FIG. 3 illustrates an exemplary thermal controller 112 as including a location system 330, a battery management system 332, and one or more sensors 334, and stored information 336. For example, the location system 330 may be a mapping system or a navigation system that uses GPS or other location-detecting and/or mapping technologies. The stored information 336 may include information stored by the controller 112 that describes past use of the system 100. In some embodiments, the stored information 336 describes previous user actions that may be used by the controller 112 to predict future user actions. In some embodiments, the stored information 336 describes operating characteristics previously experienced by the system 100, such as energy usage rates under specific operating conditions.

In some embodiments, the location system 330 is operable to plan a route. The route planned by the location system 330 may be a route from a current location of the system 100 to a destination. In some embodiments, the location system 330 is operable to identify intermediate locations, called waypoints, along a route between the current location and the destination. In some embodiments, the location system 330 is operable to receive destinations entered by a user through a user interface. In some embodiments, the location system 330 is operable to identify a destination based on the stored information 336. Thus, if the stored information 336 indicates that the user is travelling along a commonly used route, such as from the user's place of work to the user's home, the location system 330 may set the destination accordingly.

In some embodiments, the battery management system 332 is operable to monitor operation of the battery pack 106, such as pack temperature, state of charge, and so forth. As discussed above, the thermal conditions of a battery pack can limit the rate at which the pack can be charged. For example, a hot battery should not be charged at a high rate in order to protect its internal cell chemistry. Charging at a slower rate, while possible, lengthens the charging process. To enhance the user experience of the system 100 by reducing the amount of time spent charging the battery pack 106, the battery management system 332 may precondition the battery pack 106 in advance of charging such as by pre-cooling the battery pack 106 while system 100 is en route to a charging location, as facilitated by location system 330. Preconditioning is particularly favorable with charging locations that support higher charging rates, as the battery management system 332 allows charging at higher rates by reducing the temperature of the battery pack 106 prior to charging.

The sensors 334 provide information regarding the state of other parts of the system 100, and information regarding the environment surrounding the system 100. The information collected by the sensors 334 may be provided to other components of the controller 112 in the form of signals or data, such as voltage and/or current information in support of Coulomb-counting techniques.

Figure 4:
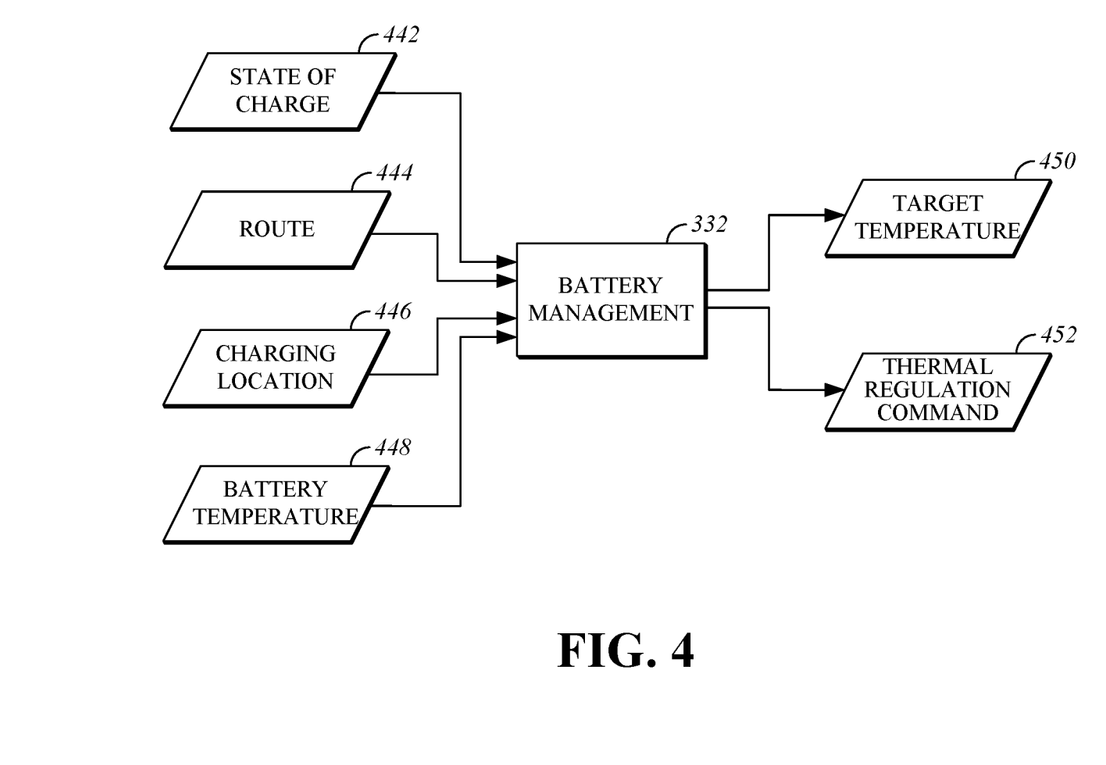
FIG. 4 is an illustration showing an exemplary battery management system.

As shown in FIG. 4 the battery management system 332 utilizes information regarding the system 100 and the surrounding environment to change operating parameters for the system 100 in order to enhance the experience of the user of the system 100. As examples, the battery management system 332 may receive state of charge information 442, route information 444, charging location information 446, and battery temperature information 448. As outputs, the battery management system 332 may generate a target temperature 450 and a thermal regulation command 452.

The state of charge information 442 is information that represents an amount of electrical energy that is stored in the battery pack 106 and that may be available to the components 104. The state of charge information 442 may be derived from information provided by the sensors 334. The battery management system 332 uses the state of charge information 442 to determine, such as by estimating, an operating time. The operating time represents the amount of time that the system 100 can continue to function prior to recharging the battery pack 106. As an example, operating time may be estimated based on a number of factors, such as information describing a manner in which the system 100 is currently being used and stored information describing previously-experienced energy usage rates under similar operating conditions.

The route information 444 may be obtained from the location system 330. The route information 444 may include the planned route for the system 100. The route information 444 may include the current location of the system 100, such as in geospatial coordinates. The route information 444 may include a destination location for the system 100. The route information 444 may include waypoint locations along the planned route.

The charging location information 446 identifies the locations of chargers that are near the system 100 and/or near the planned route. The charging location information 446 may include information describing the geographic location of the charger. The charging location information 446 may also include information describing the capability and/or type of chargers available at a charging location. As an example, the charging location information 446 may include information describing a rate at which electrical energy can be supplied to the system 100 by the charger. This information may be in the form of a numerical rate, or a non-rate based classifier such as a term used to describe chargers having particular characteristics.

The charging location information 446 may include information that was previously stored by the system 100. In some embodiments, the user may provide information to the system 100 describing the charging location. In some embodiments, the system 100 may store information describing a charging location when the system 100 is charged, such that the charging location information includes information describing charging locations that have previously been used by the system 100. In this example, the charging location information 446 may also describe user behaviors relative to particular charging locations, such as information describing a number of times a particular charging location has been used, or information describing a likelihood that the system 100 will be charged at a particular charging location when the system 100 is near the charging location. In some embodiments, the system 100 includes a data source, such as a database or a list, identifying charging locations. In some embodiments, the system 100 may obtain the charging location information 446 from an external data source, such as a data source accessed via the internet.

The battery temperature information 448 includes information describing a current temperature of the battery pack 106. The battery temperature information 448 may be derived from information received from the sensors 334, which may include a temperature sensor disposed near or within the battery pack 106.

In some implementations, the battery temperature information 448 includes or represents a single temperature measurement taken within or adjacent to the battery pack 106. In some implementations, the battery temperature information 448 includes or represents an average of multiple temperature measurements taken within or adjacent to the battery pack 106. In some implementations, the battery temperature information 448 includes or represents a maximum value from multiple temperature measurements taken within or adjacent to the battery pack 106. In some implementations, the battery temperature information 448 includes or represents a temperature of the fluid media upon exiting the heat transfer component 220, as this temperature is related to the average temperature of the battery pack 106.

The battery management system 332 sets the target temperature 450 based on some or all of the state of charge information 442, the route information 444, the charging location information 446, and the battery temperature information 448. Upon setting the target temperature 450, the battery management system 332 may cause operation of the thermal regulation system 108 in a manner intended to cause the actual temperature of the battery pack 106 to move towards the target temperature 450 by outputting the thermal regulation command 452 and transmitting the thermal regulation command 452 to the thermal regulation system 108. In various embodiments, system 100 can be a portion of an electronic device such as a computer or phone, or be embedded into an automotive system.

When charge preconditioning is not being applied to the battery pack 106 by the battery management system 332, the target temperature 450 may be set to a nominal setting within the normal operating temperature range. The nominal setting may be expressed as a value or range of values.

The battery management system 332 is operable to modify the target temperature 450 based on the charging location information 446. Using the charging location information 446, the battery management system 332 may reduce the actual temperature of the battery pack 106 before the system reaches a charging location by setting the target temperature 450 to a charge preconditioning setting and outputting a thermal regulation command 452 that corresponds to the charge preconditioning setting. By reducing the temperature of the battery pack 106 prior to commencement of a charging operation, charging can occur at a faster rate as compared to the charging rate that would be possible if the system 100 arrived at the charger after regulating the temperature of the battery pack 106 using the nominal setting.

The charge preconditioning setting may be a specific value or a range of values. As an example, the charge preconditioning setting may be between twenty-eight and forty-five degrees Celsius, and the thermal regulation system 108 may be operable to achieve a temperature reduction of this magnitude within fifty minutes during operation of the system 100.

The battery management system 332 can modify the target temperature 450 from the nominal setting to the charge preconditioning setting in response to determining that the system 100 is to charge at a charging location. For example, the battery pack 106 may be cooled while the system 100 is en route to a charger. In order to cool the battery pack 106 to allow more effective charging, the target temperature 450 is set to a temperature that is lower than the actual temperature of the battery pack 106, which is determined as described with respect to the battery temperature information 448.

The battery management system 332 may identify a charging location based on the charging location information 446, set the target temperature 450 for thermal regulation of the battery pack 106 based in part on the charging location identified by the charging location information 446, and regulate the temperature of the battery pack 106 according to the target temperature 450 by outputting the thermal regulation command 452 to the thermal regulation system 108 accordingly.

The battery management system 332 may set the target temperature 450 based on the planned route for the system 100, as determined based on the route information 444 received from the location system 330, such that the temperature of the battery pack 106 is regulated according to the charge preconditioning setting while the system 100 is travelling to the charging location using the route.

The battery management system 332 may determine whether a charging operation is likely to occur while system 100 is traveling to a destination. For example, battery management system 332 may predict that battery pack 106 will run out of charge before system 100 reaches its intended destination. In some implementations, the determination is made based on the time or distance required to reach the destination from the present location of system 100 and the available state of charge in battery pack 106. Thus, when the state of charge information 442 indicates that the system 100 will be operable for a time or range that is less than a time or range threshold value, the battery management system 332 may determine that charging is likely and modify the target temperature to cool the battery pack 106 prior to charging, such as by changing the target temperature 450 from the nominal setting to the charge preconditioning setting. In some implementations, the determination is made based on the availability of charging locations while en route to the intended destination.

Figure 5:
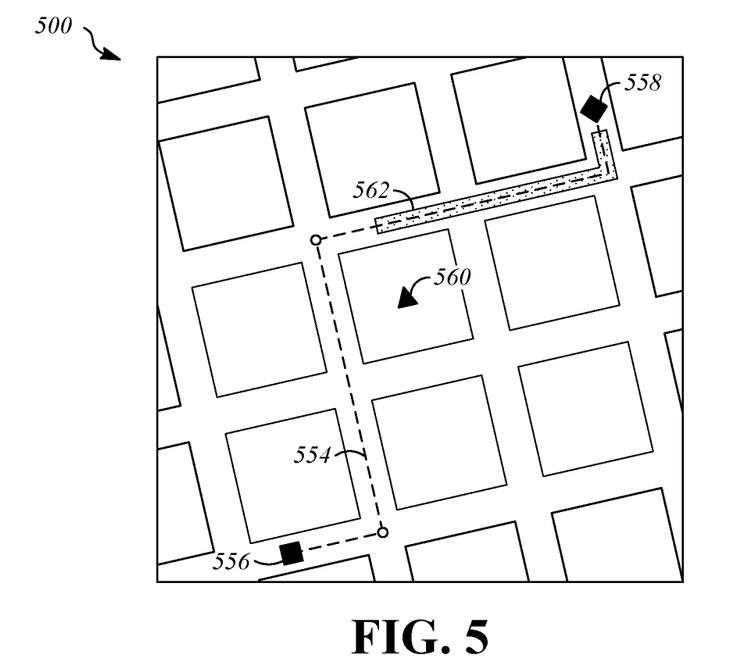
FIG. 5 is an illustration showing an exemplary planned route.

FIG. 5 shows a planned route 554 for the system 100 according to a first example 500. The planned route 554 follows a network of transportation facilities such as paths, sidewalks, transit routes, and/or streets from a current location 556 of the system 100 to a destination 558. A charging location 560 is situated near the planned route 554.

The battery management system 332 may determine the operating time for the system 100 based on the state of charge information 442 and determine a probability that the system 100 will stop at the charging location as a function of the operating time, the distance from the current location 556 to the destination 558, and optionally, other factors. The other factors may include a factor of safety that models the operating time of the system 100 as a percentage of an expected operating time for the system 100.

As an example, the probability of that the system 100 will be transported to a charger may be modelled such that the probability increases as a ratio of the time to travel from the current location 556 to the destination 558 compared to the operating time approaches one. The probability may be modeled such that it reaches 100% when this ratio reaches a value that is slightly less than or equal to one. Thus, if the state of charge information 442 indicates that the operating time of the system 100 is not sufficient to continue operation of the system 100 until it reaches the destination 558, the battery management system 332 may determine that the probability of a charging operation occurring prior to reaching the destination is 100 percent.

In the first example 500, the battery management system 332 determines that it is likely that the system 100 will be charged at the charging location 560 based on the state of charge information 442, as a portion 562 of the planned route 554 lies beyond the operating time and/or range of the system 100, and the charging location 560 is near the planned route 554.

In situations where multiple charging locations are located along the planned route 554, the charging location 560 may be identified as the likely location for the charging operation based on factors such as location, state of charge of the battery pack 106, the stored information 333, and the charging location information.

To prepare the system 100 for the charging operation, the battery management system 332 sets the target temperature 450 according to the charge preconditioning setting, to reduce the temperature of the battery pack 106 in advance of the expected charging operation. The battery management system 332 may set the target temperature 450 according to the charge preconditioning setting in advance of anticipated arrival at the charging location 560 to allow sufficient time to reduce the temperature of the battery pack 106. As an example, the target temperature 450 may be reduced to cool the battery pack 106 between fifteen and sixty minutes before arrival at the charging location 560.

Figure 6:
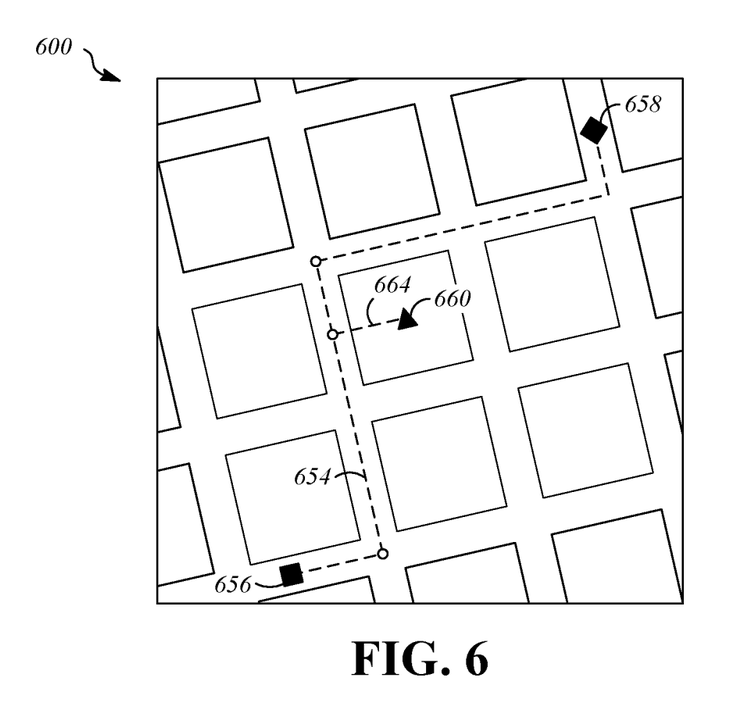
FIG. 6 is an illustration showing an exemplary planned route.

FIG. 6 shows a planned route 654 for the system 100 according to a second example 600. The planned route 654 follows a network of transportation facilities such as paths, sidewalks, transit routes, and/or streets from a current location 656 of the system 100 to a destination 658. A charging location 660 is situated near the planned route 654. The planned route 654 includes a planned stop 664 at the charging location 660.

In this example, the planned stop 664 is a user-specified destination that corresponds to the charging location 660. The battery management system 332 may interpret this as an explicit indication by the user that a charging operation will occur at the charging location 660. To prepare the system 100 for the charging operation, the battery management system 332 sets the target temperature 450 according to the charge preconditioning setting to cool the battery pack 106 in advance of the charging operation while the system 100 is traveling to the charging location 660 using the planned route 654.

In some implementations, the battery management system 332 may set the target temperature 450 based in part on a battery charging power level that is supported by the charging location 660. The battery charging power level may be included in the charging location information 446. For example, if the battery charging power level is above a threshold value, the battery management system 332 determines that cooling the battery pack 106 in advance of charging will be beneficial, and reduces the target temperature 450. In this example, the target temperature 450 is not reduced if the battery charging power level is below the threshold value. In other implementations, the target temperature is set according to a sliding scale, with the temperature values used for the target temperature 450 decreasing as the battery charging power level increases. In the example of FIG. 6, the battery management system 332 may determine that a battery charging power level for the charging location 660 is below a threshold value, and in response, maintain the target temperature 450 according to the nominal setting instead of cooling the battery pack 106. Exemplary battery charging power levels include DC fast charge, as well as other power levels defined in the SAE J1772 charging standard or future charging standards. Battery charging power levels may be expressed in terms of watts per hour of energy being directed to a battery system.

In some implementations, the battery management system 332 determines whether or not to cool the battery pack 106 in advance of charging based on part on the state of charge information 442, by determining a travel energy requirement. The travel energy requirement represents an anticipated amount of electrical energy that will be removed from the battery for utilization by the components 104 while the system 100 is en route to a charging location such as the charging location 660 of FIG. 6 using the planned route 654. The travel energy requirement may also account for energy utilization due to internal impedance of the battery pack 106 and other systems. As one example, the travel energy requirement may be calculated based on a time or distance expected for travel using the planned route 654 multiplied by an energy usage rate expressed per unit of time or per unit of distance. The battery management system 332 may also determine an excess energy amount based on the travel energy requirement and the state of charge of the battery pack 106, and cooling the battery pack 106 using the thermal regulation system 108 using the excess energy amount. During travel to the charging location 660, this determination can be re-evaluated. Thus, if the route changes or if energy consumption is greater than expected, the target temperature 450 can be revised, such as by setting it according to the nominal setting, in order to conserve electrical energy and maximize operating time.

Figure 7:
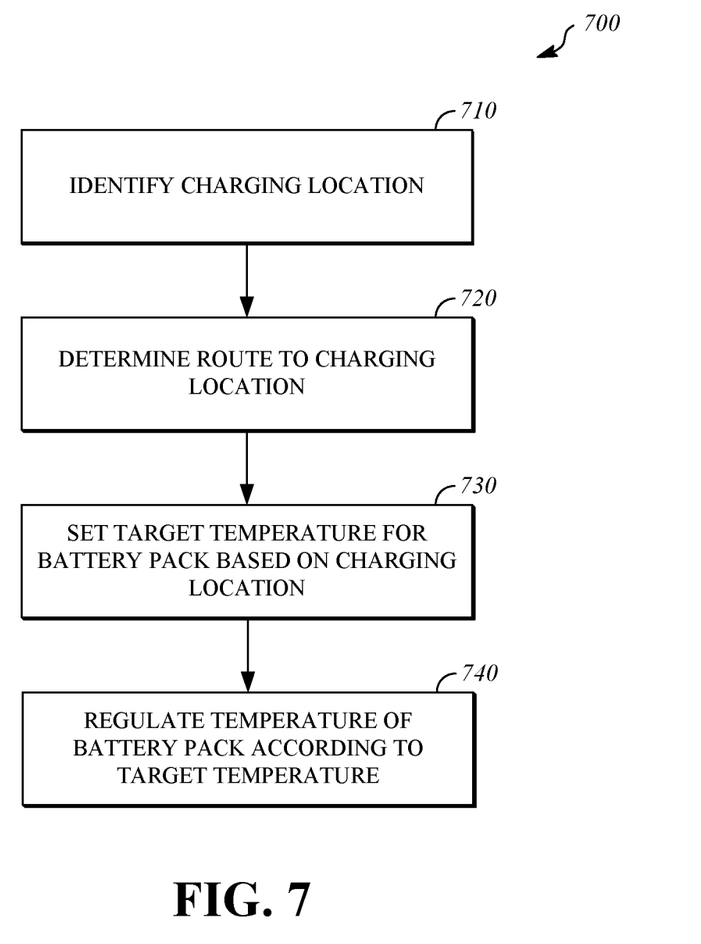
FIG. 7 is a flowchart showing an exemplary battery management process.

FIG. 7 shows an example of a battery management process 700. In operation 710, a charging location is identified, such as by the battery management system 332 using the charging location information 446. In operation 720, a route to the charging location is identified, such as by using the route information 444 from the location system 330. For example, the battery management system 332 could request a route to the charging location from the location system 330. In operation 730, the target temperature 450 for thermal regulation of the battery pack 106 is set based in part on the charging location. In operation 740, the temperature of the battery pack 106 is regulated according to the target temperature 450, such as by operating the thermal regulation system 108 in accordance with the thermal regulation command 452.

Figure 8:
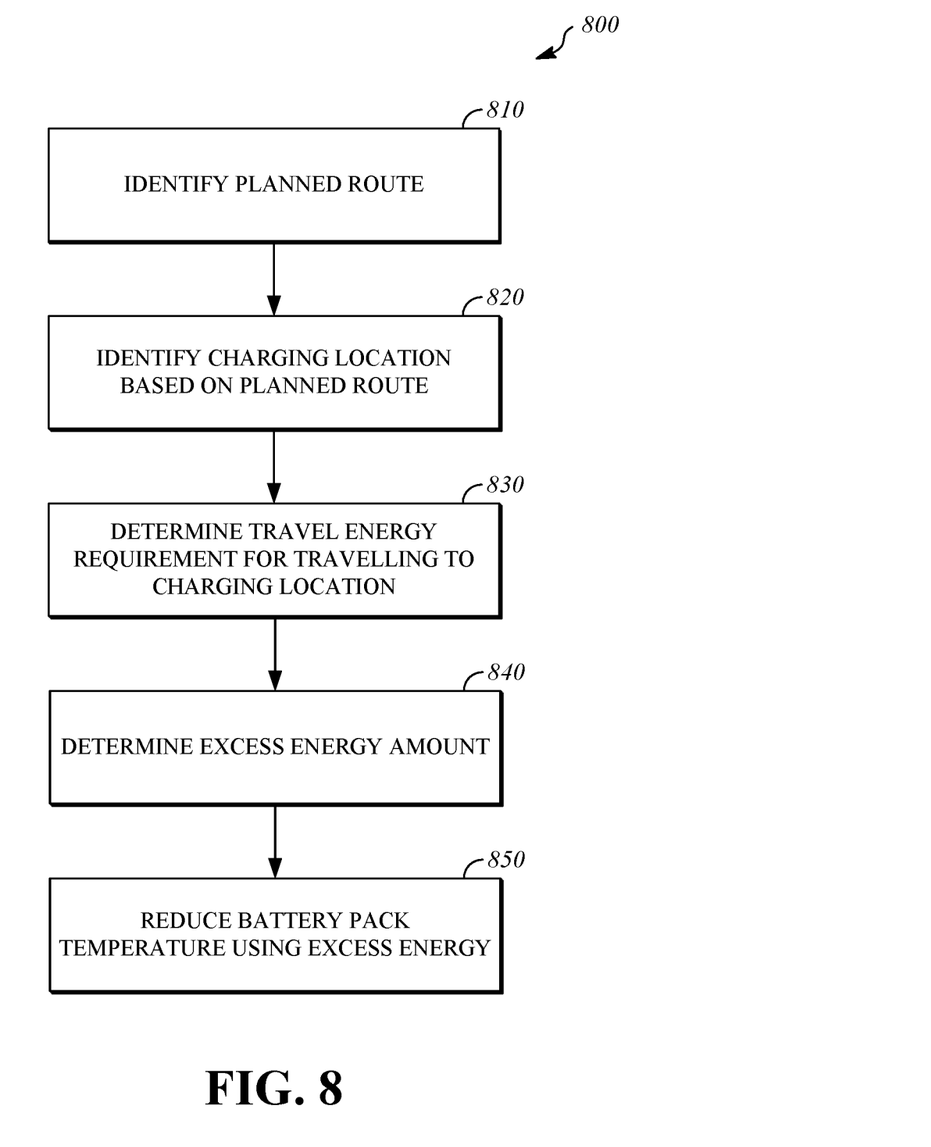
FIG. 8 is a flowchart showing an exemplary battery management process.

FIG. 8 shows an example of a battery management process 800. Operation 810 includes identifying a planned route. Operation 820 includes identifying a charging location based on the planned route. Operation 830 includes determining a travel energy requirement that represents anticipated energy usage during travel to the charging location using the planned route. In operation 840, an excess energy amount is determined based on the travel energy requirement and a state of charge of the battery pack 106, where the excess energy amount represents electrical energy that is in excess of what is needed for system 100 to maintain operation while travelling to the charging location. In operation 850, the temperature of the battery pack 106 is reduced using the thermal regulation system 108 in response to determining that the excess energy amount exceeds a cooling energy requirement for reducing the temperature of the battery pack 106.

Figure 9:
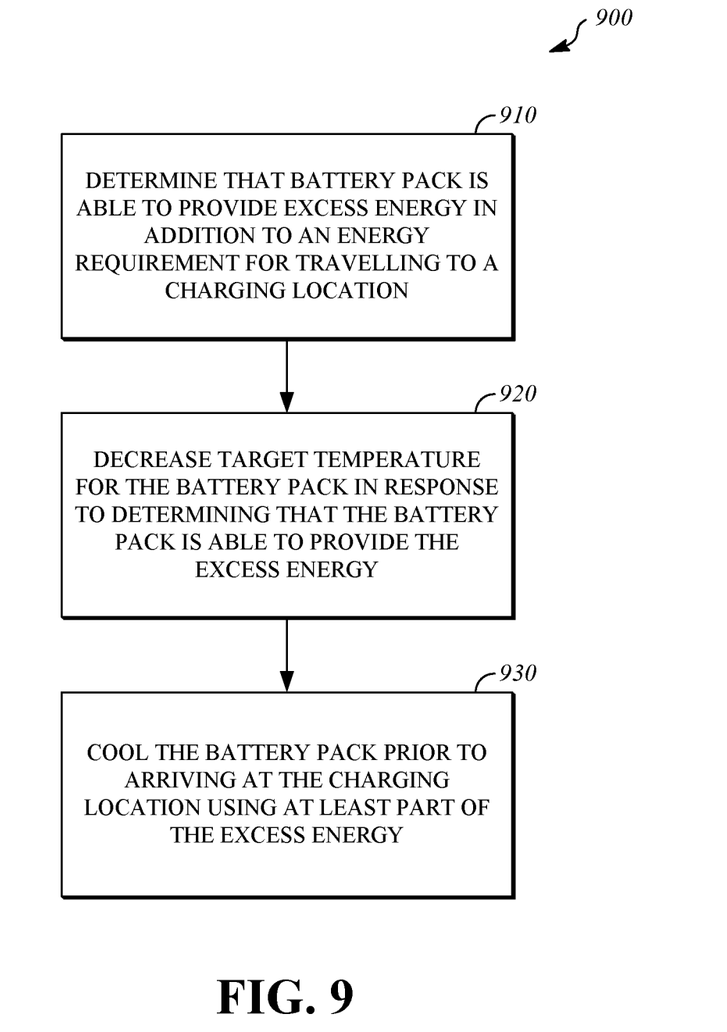
FIG. 9 is a flowchart showing an exemplary battery management process.

FIG. 9 shows an example of a battery management process 900. Operation 910 includes determining that the battery pack 106 is able to provide excess energy in addition to an anticipated energy usage during travel to a charging location. Operation 920 includes decreasing the target temperature 450 for the battery pack 106 in response to determining that the battery pack 106 is able to provide the excess energy. Operation 930 includes cooling the battery pack 106 prior to arriving at the charging location using at least part of the excess energy.

Figure 10:
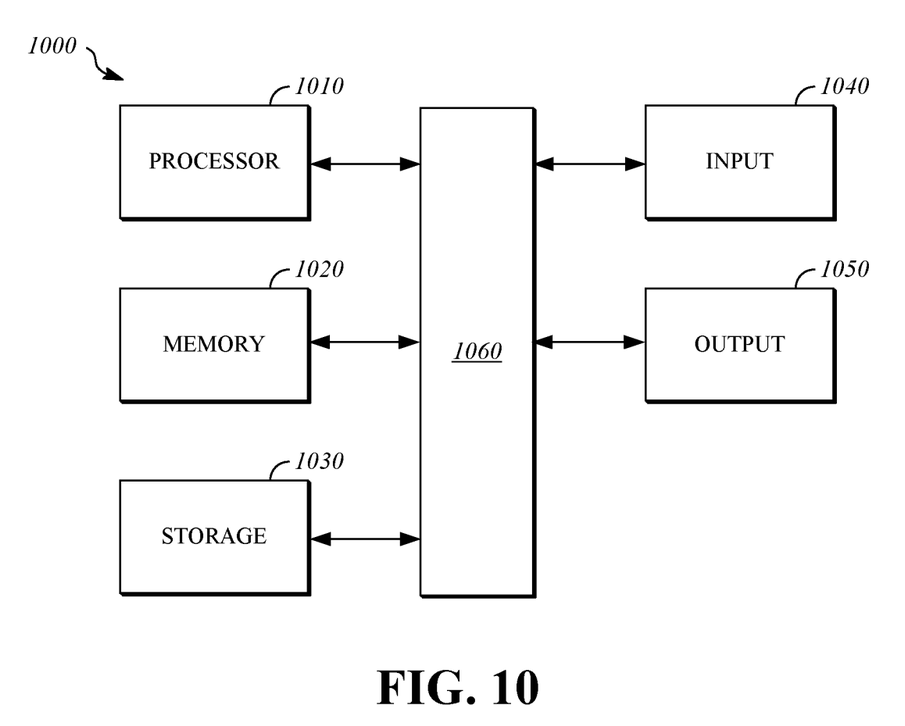
FIG. 10 is an illustration showing an exemplary hardware configuration for a controller.

FIG. 10 shows an example of a hardware configuration for a controller 1000 that may be used to implement the controller 112 and/or other portions of the system 100. In the illustrated example, the controller 1000 includes a processor 1010, memory 1020, a storage device 1030, one or more input devices 1040, and one or more output devices 1050. These components may be interconnected by hardware such as a bus 1060 that allows communication between the components. The processor 1010 may be a conventional device such as a central processing unit, and is operable to execute computer program instructions and perform operations described by the computer program instructions. The memory 1020 may be a volatile, high-speed, short-term information storage device such as a random-access memory module. The storage device 1030 may be a non-volatile information storage device such as a hard drive or a solid state drive. The input devices 1040 may include any type of human-machine interface such as buttons, switches, a keyboard, a mouse, a touchscreen input device, a gestural input device, or an audio input device. The output devices 1050 may include any type of device operable to provide an indication to a user regarding an operating state, such as a display screen or an audio output.

What is claimed is:

1. A method, comprising:
   determining, by an electro-mechanical system that includes a battery pack, that a potential charging operation is likely to occur based on a state of charge of the battery pack; and
   cooling the battery pack to prepare the battery pack for the potential charging operation.

2. The method of claim 1, wherein determining that the potential charging operation is likely to occur is based further on a user-specified destination.

3. The method of claim 2, wherein determining that the potential charging operation is likely to occur comprises: determining that an anticipated battery use for travel to the user-specified destination exceeds a threshold value.

4. The method of claim 1, further comprising:
   identifying, by the system, a potential battery charging location for the potential charging operation, wherein cooling the battery pack to prepare the battery pack for the potential charging operation is performed prior to arriving at the potential battery charging location.

5. The method of claim 4, wherein identifying the potential battery charging location further comprises:
   determining a route to a user-specified destination, wherein the potential battery charging location is identified based on proximity of the potential battery charging location to the route to the user-specified destination.

6. The method of claim 1, wherein cooling the battery pack to prepare the battery pack for the potential charging operation includes reducing a temperature of the battery pack relative to a current temperature of the battery pack prior to the potential charging operation.

7. The method of claim 1, further comprising:
   identifying, by the system, a potential battery charging location for the potential charging operation, wherein cooling the battery pack to prepare the battery pack for the potential charging operation is performed prior to arriving at the potential battery charging location,
   wherein determining that the potential charging operation is likely to occur includes determining that an anticipated battery use for traveling to a user-specified destination exceeds a threshold value, and
   wherein cooling the battery pack to prepare the battery pack for the potential charging operation includes reducing a temperature of the battery pack relative to a current temperature of the battery pack prior to the potential charging operation.

8. An apparatus, comprising:
   a battery pack; and
   an electro-mechanical system that is configured to:
      determine that a potential charging operation is likely to occur based on a state of charge of the battery pack; and
      cool the battery pack to prepare the battery pack for the potential charging operation.

9. The apparatus of claim 8, wherein the system is further configured to determine that the potential charging operation is likely to occur based further on a user-specified destination.

10. The apparatus of claim 9, wherein the system is configured to determine that the potential charging operation is likely to occur based on a determination that an anticipated battery use for travel to the user-specified destination exceeds a threshold value.

11. The apparatus of claim 8, wherein the system is further configured to:
   identify a potential battery charging location for the potential charging operation, wherein cooling the battery pack to prepare the battery pack for the potential charging operation is performed prior to arriving at the potential battery charging location.

12. The apparatus of claim 11, wherein the system is further configured to identify the potential battery charging location based on proximity of the potential battery charging location to a route to a user-specified destination.

13. The apparatus of claim 8, wherein the system is configured to cool the battery pack to prepare the battery pack for the potential charging operation by reducing a temperature of the battery pack relative to a current temperature of the battery pack prior to the potential charging operation.

14. The apparatus of claim 8, wherein the system is further configured to:
identify a potential battery charging location for the potential charging operation, wherein the system is configured to cool the battery pack to prepare the battery pack for the potential charging operation prior to arriving at the potential battery charging location,
wherein the system is configured to determine that the potential charging operation is likely to occur based on a determination that an anticipated battery use for travel to a user-specified destination exceeds a threshold value, and
wherein the system is configured to cool the battery pack to prepare the battery pack for the potential charging operation by reducing a temperature of the battery pack relative to a current temperature of the battery pack prior to the potential charging operation.

15. A non-transitory computer-readable storage device including program instructions executable by one or more processors that, when executed, cause the one or more processors to perform operations, the operations comprising:
determining, by an electro-mechanical system that includes a battery pack, that a potential charging operation is likely to occur based on a state of charge of the battery pack; and
cooling the battery pack to prepare the battery pack for the potential charging operation.

16. The non-transitory computer-readable storage device of claim 15, wherein determining that the potential charging operation is likely to occur is based further on a user-specified destination.

17. The non-transitory computer-readable storage device of claim 16, wherein determining that the potential charging operation is likely to occur comprises:
determining that an anticipated battery use for travel to the user-specified destination exceeds a threshold value.

18. The non-transitory computer-readable storage device of claim 15, the operations further comprising:
identifying, by the system, a potential battery charging location for the potential charging operation, wherein cooling the battery pack to prepare the battery pack for the potential charging operation is performed prior to arriving at the potential battery charging location.

19. The non-transitory computer-readable storage device of claim 18, wherein identifying the potential battery charging location further comprises:
determining a route to a user-specified destination, wherein the potential battery charging location is identified based on proximity of the potential battery charging location to the route to the user-specified destination.

20. The non-transitory computer-readable storage device of claim 15, wherein cooling the battery pack to prepare the battery pack for the potential charging operation includes reducing a temperature of the battery pack relative to a current temperature of the battery pack prior to the potential charging operation.

21. The non-transitory computer-readable storage device of claim 15, the operations further comprising:
identifying, by the system, a potential battery charging location for the potential charging operation, wherein cooling the battery pack to prepare the battery pack for the potential charging operation is performed prior to arriving at the potential battery charging location,
wherein determining that the potential charging operation is likely to occur includes determining that an anticipated battery use for traveling to a user-specified destination exceeds a threshold value, and
wherein cooling the battery pack to prepare the battery pack for the potential charging operation includes reducing a temperature of the battery pack relative to a current temperature of the battery pack prior to the potential charging operation.

* * * * *